(12) United States Patent
Soosahabi

(10) Patent No.: US 11,589,237 B2
(45) Date of Patent: Feb. 21, 2023

(54) METHODS, SYSTEMS, AND COMPUTER READABLE MEDIA FOR MITIGATING UNAUTHORIZED MESSAGE RELAY ATTACKS

(71) Applicant: Keysight Technologies, Inc., Santa Rosa, CA (US)

(72) Inventor: Reza Soosahabi, Austin, TX (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 17/352,041

(22) Filed: Jun. 18, 2021

(65) Prior Publication Data

US 2022/0286859 A1 Sep. 8, 2022

Related U.S. Application Data

(60) Provisional application No. 63/189,016, filed on May 14, 2021, provisional application No. 63/155,663, filed on Mar. 2, 2021.

(51) Int. Cl.
*H04W 12/106* (2021.01)
*H04W 12/122* (2021.01)

(52) U.S. Cl.
CPC ....... *H04W 12/122* (2021.01); *H04W 12/106* (2021.01)

(58) Field of Classification Search
CPC .................................................. H04W 12/122
See application file for complete search history.

(56) References Cited

U.S. PATENT DOCUMENTS

| | | |
|---|---|---|
| 8,166,528 B2 | 4/2012 | Inoue et al. |
| 8,737,980 B2 | 5/2014 | Doshi et al. |
| 9,374,837 B2 | 6/2016 | Narasimha et al. |
| 9,578,617 B2 | 2/2017 | Nyman et al. |
| 9,774,618 B2 | 9/2017 | Sundhar et al. |
| 10,555,241 B2 | 2/2020 | Selander et al. |
| 2007/0019769 A1 | 1/2007 | Green et al. |
| 2011/0124295 A1 | 5/2011 | Mahjoubi Amine et al. |

(Continued)

OTHER PUBLICATIONS

Soosahabi et al., "On Securing MAC Layer Broadcast Signals Against Covert Channel Exploitation in 5G/6G & Beyond," TechRxiv. Preprint. https://doi.org/10.36227/techrxiv.16807507, v2, pp. 1-8 (Aug. 8, 2022).

(Continued)

*Primary Examiner* — Michael T Vu

(57) ABSTRACT

According to one method, the method occurs at a network node configured to relay network message information or derivative information to avoid resource contentions between user equipment (UE). The method includes receiving a first temporary UE identifier (TUEI) associated with a first UE for requesting a radio resource within a serving cell; assigning, using the first TUEI, the radio resource to the first UE; generating, using at least a conversion algorithm, a second value based on the first TUEI, wherein the second value has a higher entropy characteristic than the first TUEI, thereby reducing the likelihood of the second value including an encoded message decodable by a second UE when relayed by the network node; and broadcasting a message including the second value to a plurality of UEs including the second UE.

20 Claims, 11 Drawing Sheets

(56) References Cited

U.S. PATENT DOCUMENTS

| | | | |
|---|---|---|---|
| 2011/0263215 A1 | 10/2011 | Asplund et al. | |
| 2014/0092771 A1 | 4/2014 | Siomina et al. | |
| 2014/0341052 A1 | 11/2014 | Devarasetty et al. | |
| 2015/0249979 A1* | 9/2015 | Kim | H04W 8/005 370/329 |
| 2016/0014625 A1 | 1/2016 | Devarasetty | |
| 2017/0195357 A1 | 7/2017 | Sundhar et al. | |
| 2017/0201925 A1* | 7/2017 | Chong | H04W 48/18 |
| 2019/0082364 A1* | 3/2019 | Zhang | H04W 76/16 |

OTHER PUBLICATIONS

Notice of Allowance and Fee(s) Due for U.S. Appl. No. 14/984,359 (dated May 24, 2017).

Non-Final Office Action for U.S. Appl. No. 14/984,359 (dated Nov. 28, 2016).

Khosroshahy et al., "Botnets in 4G Cellular Networks: Platforms to Launch DDoS Attacks Against the Air Interface," 2013 International Conference on Selected Topics in Mobile and Wireless Networking, Montreal, Canada, DOI: 10.1109/MoWNet.2013.6613793, pp. 1-7 (Aug. 19-21, 2013).

"3rd Generation Partnership Project; Technical Specification Group Radio Access Network; Study on New Radio (NR) to support non-terrestrial networks (Release 15)," 3GPP TR 38.811, V15.4.0, pp. 1-127 (Sep. 2020).

"5G; NR; Medium Access Control (MAC) protocol specification (3GPP TS 38.321 version 15.2.0 Release 15)," ETSI TS 138 321, V15.2.0, pp. 1-74 (Sep. 2018).

\* cited by examiner

800

| Msg4-NBF Type | Performance Impact | Blocking efficacy | Attacker's Codebook Effect |
|---|---|---|---|
| ALGORITHM 500 | Very Low | Low | Dynamically Recomputed |
| ALGORITHM 600 | Considerable | Significant | Static for Error Correction |
| ALGORITHM 700 | Very Low | Very High | Nearly Infeasible |

FIG. 8

METHODS, SYSTEMS, AND COMPUTER READABLE MEDIA FOR MITIGATING UNAUTHORIZED MESSAGE RELAY ATTACKS

PRIORITY CLAIM

This application claims the priority benefit of U.S. Provisional Patent Application Ser. No. 63/155,663 filed on Mar. 2, 2021 and U.S. Provisional Patent Application Ser. No. 63/189,016 filed on May 14, 2021; the disclosures of which are incorporated herein by reference in their entireties.

TECHNICAL FIELD

The subject matter described herein relates to wireless network security. More specifically, the subject matter relates to methods, systems, and computer readable media for mitigating unauthorized message relay attacks.

BACKGROUND

Various wireless networks may utilize radio resource contention resolution procedures or techniques. For example, in a 4G or 5G network, user equipment (UE) may initiate a random access (RA) procedure with a base station (e.g., eNode B or gNodeB) for determining appropriate radio resources to use for uplink communications. During respective concurrent RA procedures, contending UEs may select the same resources (e.g., a same RA radio network temporary identifier (RA-RNTI) and an RA preamble identifier (RAPID)) and send contending first messages (e.g., RA preamble messages) indicating the same resources to the base station. In response to one of the first messages, the base station may send a second message (an RA response (RAR) message) providing an uplink grant. The contending UEs may receive the second message and assume the second message is directed to them. To determine which of the UEs will ultimately use the radio resources, a contention resolution procedure may follow where each contending UE sends a radio resource control (RRC) connection request containing an arbitrary (e.g., self-selected) temporary UE identifier (TUEI), e.g., a 48-bit UE contention resolution identity (CRI), and the base station responds with an RRC connection setup (e.g., a contention resolution response) containing the arbitrary TUEI that is to use the requested radio resources (the other contending UE(s) should back off and attempt another RA procedure).

Vulnerabilities exist in the resource contention resolution procedure used with the 5G new radio (NR) interface, the LTE air interface, and various other air interfaces. Such vulnerabilities can be used to perform unauthorized message relay attacks, e.g., a UE can encode a secret message that gets broadcasted or relayed by a base station to another UE without authorization from the network or network operator.

SUMMARY

Methods, systems, and computer readable media for mitigating unauthorized message relay attacks are disclosed. According to an example method, the method occurs at a network node configured to relay network message information or derivative information to avoid resource contentions between user equipment (UE). The method includes receiving a first temporary UE identifier (TUEI) associated with a first UE for requesting a radio resource within a serving cell; assigning, using the first TUEI, the radio resource to the first UE; generating, using at least a conversion algorithm, a second value based on the first TUEI, wherein the second value has a higher entropy characteristic than the first TUEI; and broadcasting a message including the second value to a plurality of UEs including the second UE.

According to an example system, the system includes a network node configured to relay network message information or derivative information to avoid resource contentions between UE, where the network node is implemented using the at least one processor. The network node is configured for: receiving a first TUEI associated with a first UE for requesting a radio resource within a serving cell; assigning, using the first TUEI, the radio resource to the first UE; generating, using at least a conversion algorithm, a second value based on the first TUEI, wherein the second value has a higher entropy characteristic than the first and broadcasting a message including the second value to a plurality of UEs including the second UE.

The subject matter described herein may be implemented in software in combination with hardware and/or firmware. For example, the subject matter described herein may be implemented in software executed by a processor. In one exemplary implementation, the subject matter described herein may be implemented using a non-transitory computer readable medium having stored therein computer executable instructions that when executed by the processor of a computer control the computer to perform steps. Exemplary computer readable media suitable for implementing the subject matter described herein include non-transitory devices, such as disk memory devices, chip memory devices, programmable logic devices, field-programmable gate arrays, and application specific integrated circuits. In addition, a computer readable medium that implements the subject matter described herein may be located on a single device or computer platform or may be distributed across multiple devices or computer platforms.

As used herein, the term 'node' refers to at least one physical computer platform including one or more processors, network interfaces, and/or memory.

As used herein, each of the terms 'function', 'engine', and 'module' refers to hardware, which may also include software and/or firmware, for implementing the feature(s) being described.

As used herein, the term "mobile communications network" refers to a system of nodes that support wireless communications between user terminals. Example mobile communications networks may include fourth generation (4G) networks (e.g., LTE-advanced networks) or 5G networks.

As used herein, the terms "mobile network equipment" and "mobile network device" refer to a mobile network entity that provides radio coverage for mobile handsets within a geographic area by providing translation between various radio interfaces to mobile handsets and wired interfaces to other mobile communications network nodes. Thus, mobile users do not communicate directly with each other, but instead communicate directly with mobile network devices over an air interface.

As used herein, the term "common public radio interface" (CPRI) refers to a standard for describing a wired communications interface between the REC and the RE components of a networking component, such as a wireless base station. CPRI may be used to divide networking components that utilize a variety of access technologies including LTE, GSM, GPRS, and the like. CPRI is an industry cooperation aimed at defining the internal interface between a radio equipment controller (REC) and the radio equipment (RE) itself. CPRI enables flexible and efficient product differentiation for radio base stations and independent technology evolution by dividing networking components (i.e., wireless base stations) into two parts (i.e., the RE and the REC) with a digital connection between the two elements. Data carried over the CPRI link is a continuous stream of numbers, representing the digitized samples of the baseband waveform. CPRI does not limit the data rate of connections, but may limit the number of antennas that may be carried on a single CPRI connection.

As used herein, the terms "next generation node B", "gNodeB", and "gNB" refer to a 5G mobile network entity having functionality similar to that of a REC and an RE in 4G/LTE networks. The DU of the gNB communicates directly with UEs and is responsible for header compression, ciphering, reliable delivery of packets, admission control, and radio resource management. By eliminating the CU from the data path and incorporating some of its functions into the DU, packet delay may be decreased and network performance may be increased. Evolved CPRI (eCPRI) can involve dividing the gNB into two parts, a CU component and one or more radio based DU components, where multiple DUs may be associated with a single CU being connected together using a wired eCPRI link. As used herein, the terms CU and DU will primarily refer to components of a gNB, however it is appreciated that they may also refer to components of other (e.g., LTE) networking components. One or more DUs and a corresponding CU may be physically separated but connected via the eCPRI link. For example, a DU may be located close to an antenna, while the CU may be located in a more convenient and/or accessible centralized site.

As used herein, the terms "user equipment" or "UE" refer to a mobile communications terminal or handset operated by a user in a mobile communications network. Example UEs may include mobile phones and computers with wireless communications capabilities.

BRIEF DESCRIPTION OF THE DRAWINGS

Aspects of the subject matter described herein will now be explained with reference to the accompanying drawings of which:

FIG. 8 is a diagram illustrating example data related to various conversion algorithms;

DETAILED DESCRIPTION

Figure 1:
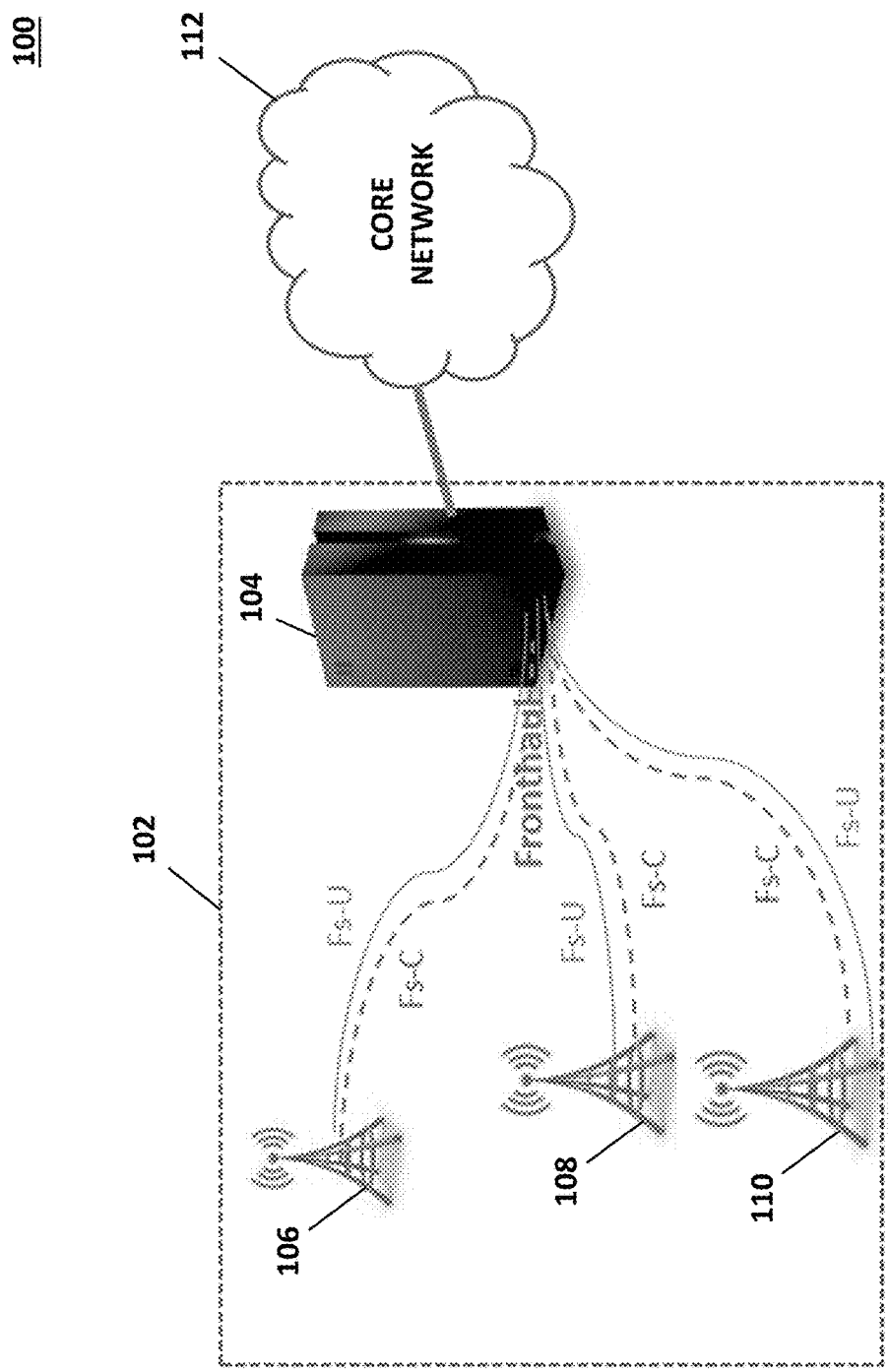
FIG. 1 is a block diagram illustrating an example fifth generation (5G) new radio (NR) network.

The subject matter described herein relates to methods, systems, and computer readable media network for mitigating unauthorized message relay attacks. Various wireless networks may utilize radio resource contention resolution procedures or techniques. For example, during a random access (RA) procedure like a UE attach procedure, there is a probability (e.g., 1 in several hundreds chance) that two UEs will select the same resources for a first message of an RA procedure (same RA-RNTI & RAPID). Due to Zadoff-Chu sequence properties used in the first message, a cell (e.g., a primary sector carrier) can successfully decode one of the RA requests and estimate timing advance (TA) that is broadcasted in a second message of the RA procedure. Two contending UEs may likely experience different TAs. For example, let UE1 denote the UE whose first message is successfully received, and let UE2 be the other contending UE. After both UEs adjust their TA according to the second message, any further transmissions from UE2 will be lost at the cell. To avoid further stalls and interference, resource contention is stopped when UE2 backs off and initiates another RA procedure.

Being at an initial stage of RRC establishment, there may be limited choices for an effective contention resolution process due to various factors. These factors may include: a serving cell cannot distinguish between contending UEs (it may not even sense the presence of UE2), a serving cell cannot send a dedicated message to each UE, and UEs can equally decode any downlink broadcast; and a UE cannot sense another UE presence and/or related UE contention. As such, 3GPP standards define a contention resolution procedure where UEs perform a ping-like test to figure out if they have the right TA. For example, in a third message of an RA procedure, each contending UE should select an arbitrary UE contention resolution identity (CRI) and send it to the relevant cell, then if the cell can only decode the UE CRI from UE1, the cell can rebroadcast the UE CRI of UE1 in a fourth message of the RA procedure, which can then be received and decoded by both UEs. In this example, the mismatch of the UE CRI of UE2 (selected and used for its third message) and the broadcasted UE CRI in the fourth message will trigger UE2 to back off (while UE1 will determine that the broadcasted UE CRI and its own CRI matches and therefore will use the radio resources).

While a UE CRI should be a unique 48-bit-long value (like a network interface media access control (MAC) address) per UE to diminish the chance of CRI collision between contending UEs (thereby let the contention continue beyond a fourth message of an RA procedure), UE CRI values do not share the hardware-persistence of network interface MAC addresses. For example, UE CRI may be randomly selected per RA attempt without further use beyond a fourth message of an RA procedure. Since a UE CRI is broadcasted in a fourth message of an RA procedure, the UE CRI can be used to detect a specific UE in a cell coverage area if kept persistent. As such, privacy concerns may be a reason for the lack of persistency.

Since a resource contention resolution procedure involves a UE-selected temporary UE identifier (TUEI), e.g., a UE CRI, broadcasted by a base station, it is possible for a UE (or entity pretending to be a UE) to exploit the resource contention resolution procedure. For example, during a resource contention resolution procedure of an RA procedure, a UE can encode a secret message into a self-selected TUEI that is sent to a base station (e.g., in a radio resource control (RRC) connection request message) and another entity (e.g., a receiver UE) may receive and decode the secret message when the TUEI is broadcasted by the base station (e.g., in an RRC connection setup message).

Example use cases utilizing or exploiting conventional resource contention resolution procedures may include data exfiltration (e.g., transmitting sensitive data from protected facilities to an outside device using the cellular carrier signal from the nearby towers); command and Control (CnC) events (e.g., anonymously communicating to remote malicious IoT devices to trigger certain events); modem backdoors (e.g., modem firmware could be tainted by malicious actors, to enable running the attack procedure in idle mode to communicate with other modems as a stealth data transfer backdoor); and failover broadcasting in disaster recovery (e.g., during natural disasters, local authorities may take advantage of a broadcasted CRI to broadcast messages to other UEs in a same geographical area.

In accordance with some aspects of the subject matter described herein, techniques, methods, or mechanisms are disclosed for mitigating data exfiltration or unauthorized message relays. In some embodiments, mitigating data exfiltration or unauthorized message relays may involve using one or more conversion algorithms and/or techniques (e.g., a cryptographic hash function (CHF) and/or a salting technique) to change or modify a TUEI provided by a UE during resource contention resolution procedure. In such embodiments, changing a or modifying the TUEI may involve increasing a entropy characteristic of the modified TUEI (relative to the original or unmodified TUEI) and may be usable to prevent, deter, or mitigate an encoded message in the TUEI from being successfully decoded by a receiving UE when the modified TUEI is broadcasted by the base station. For example, during a resource contention resolution procedure, a base station ora related entity may receive a UE-selected TUEI and may convert, transform, or modify the UE-selected TUEI to an output value such that when the output value is broadcasted (by the base station during the resource contention resolution procedure) a receiving entity cannot decode or discern an encoded message(s) originally inserted in the UE-selected TUEI by the UE, but the output value is still usable by UEs in the resource contention resolution procedure to determine whether the output value refers to their respective TUEI. Hence, in accordance with some aspects of the subject matter described herein, a generated value derived from or using a TUEI is usable for resource contention resolution purposes, while reducing or mitigating the ability of a UE from successfully performing an unauthorized relay attack.

In accordance with some aspects of the subject matter described herein, techniques, methods, or mechanisms are disclosed for utilizing multiplicative salting mitigating data exfiltration or unauthorized message relays. For example, multiplicative salting is novel method where a salt value or vector informs which characters of an input string are to be multiplied (e.g., repeated) and by how many times. In some embodiments, a multiplicative salt vector may comprise multiple pairs of elements, where each pair of elements in a multiplicative salt vector indicates a hex character and a repeat value. For example, assume 'F4' is one pair of elements in a multiplicative salt vector (e.g., where 'F' indicates the character to be repeated and '4' indicates the number of 'F's in the output value), if the input string is 'A5634F', then the effect of this pair of elements would yield an output string 'A5634FFFF'.

Advantageously, in some embodiments, by using multiplicative salting, hash collisions may be reduced or minimized compared to other salting techniques. For example, a CHF may not perform well with high-entropy strings with fixed sizes, e.g., such as CRI or MAC addresses because there may a higher chance for two such strings to produce the same hash (e.g., a hash collision) which defeats the uniqueness property of a CHF. In the example, the CHF may perform better with input that are like human words, e.g., variable in length and that have a higher chance of overlapping alphabets at the same positions. Multiplicative salting can improve the input (especially with short strings) used by a CHF to have these human word characteristics. For example, lets compare the set of all words in a dictionary versus the set of fixed size string with random elements from the same alphabet set. Notable distinctions between the words in the dictionary and the set of fixed size strings are that the words have variable lengths and higher chance of overlapping alphabets at the same positions. Multiplicative salting can create or increase these characteristics for short fixed size string sets. Consider two random strings of the same length and a salting command directing which characters should be repeated. After applying the repetition, one can see the resulted strings are likely to have variable length and show overlaps, the same properties as words in a dictionary. Hence, hashes produced from the multiplicative salted strings are believed to have a reduced chance of collision.

Reference will now be made in detail to example embodiments of the subject matter described herein, examples of which are illustrated in the accompanying drawings. Wherever possible, the same reference numbers will be used throughout the drawings to refer to the same or like parts.

FIG. 1 is a block diagram illustrating an example 5G new radio (NR) network 100. A logical architecture of a next generation nodeB (gNB) 102 is depicted in FIG. 1 as comprising a central unit 104 and a plurality of distributed units 106-110. Each of the plurality of distributed units is communicatively connected to central unit 108 via an eCPRI connection. As shown in FIG. 1, the eCPRI link is depicted as comprising Fs-C and Fs-U connections. In particular, the Fs-C connection provides control plane connectivity over an Fs interface and the Fs-U connection provides user playing connectivity over the Fs interface.

Central unit 104 may be defined as a logical node that is responsible for conducting gNB functions including user data transfer, mobility control, radio access network sharing, positioning, session management, and any other function that is not allocated exclusively to the distributed unit(s). Further, central unit 104 may be configured to control the operation of the distributed units over the fronthaul (Fs) interface. Examples of a central unit include a baseband unit (BBU), a radio equipment controller (REC), a cloud radio access network (C-RAN), and a virtual radio access network (V-RAN). In some embodiments, central unit 104 may include any centralized device or location that hosts a plurality of baseband units associated with a respective plurality of distributed units. In particular, central unit 104 is centrally positioned at a location that is not proximate to the distributed units 106-110. Likewise, each of distributed units 106-110 may be defined as a logical node that includes a subset of the gNB functions, which depend on the functional split option configured by the network operator.

Examples of the distributed unit include a remote radio head (RRH), a remote radio unit (RRU), a radio equipment (RE), and a radio unit (RU). As shown in FIG. 1, central unit 104 may also be connected to a core network 112. For example, core network 112 may comprise a next generation (NG) core network that includes a number of network elements that collectively form the backhaul portion of network 100.

As depicted in FIG. 1, a number of functions existing in the protocol stack of a gNB may be divided or split between central unit 104 and a distributed unit. In some examples, an intra-PHY split (e.g., "option 7" split) is employed to separate some portion of the PHY layer away from the central unit. Multiple realizations of this option are possible, including asymmetrical options that allow obtaining benefits of different sub-options for the uplink and downlink. This intra-PHY split option requires a compression technique in order to reduce the transport bandwidth requirements existing between the distributed unit and the central unit. In the uplink, Fast Fourier Transform (FFT) processing and cyclic prefix (CP) removal processing reside in the distributed unit as well as for two sub-variants of this option (e.g., options 7-1 and 7-2 as described below). Moreover, for purposes of downlink communication, inverse FFT (iFFT) processing and CP addition processing functionally may reside in the distributed unit while the rest of the PHY functions may reside in the CU.

It will be appreciated that FIG. 1 is for illustrative purposes and that various nodes and/or modules, locations, and/or functionality described above in relation to FIG. 1 may be changed, altered, added, or removed.

Figure 2:
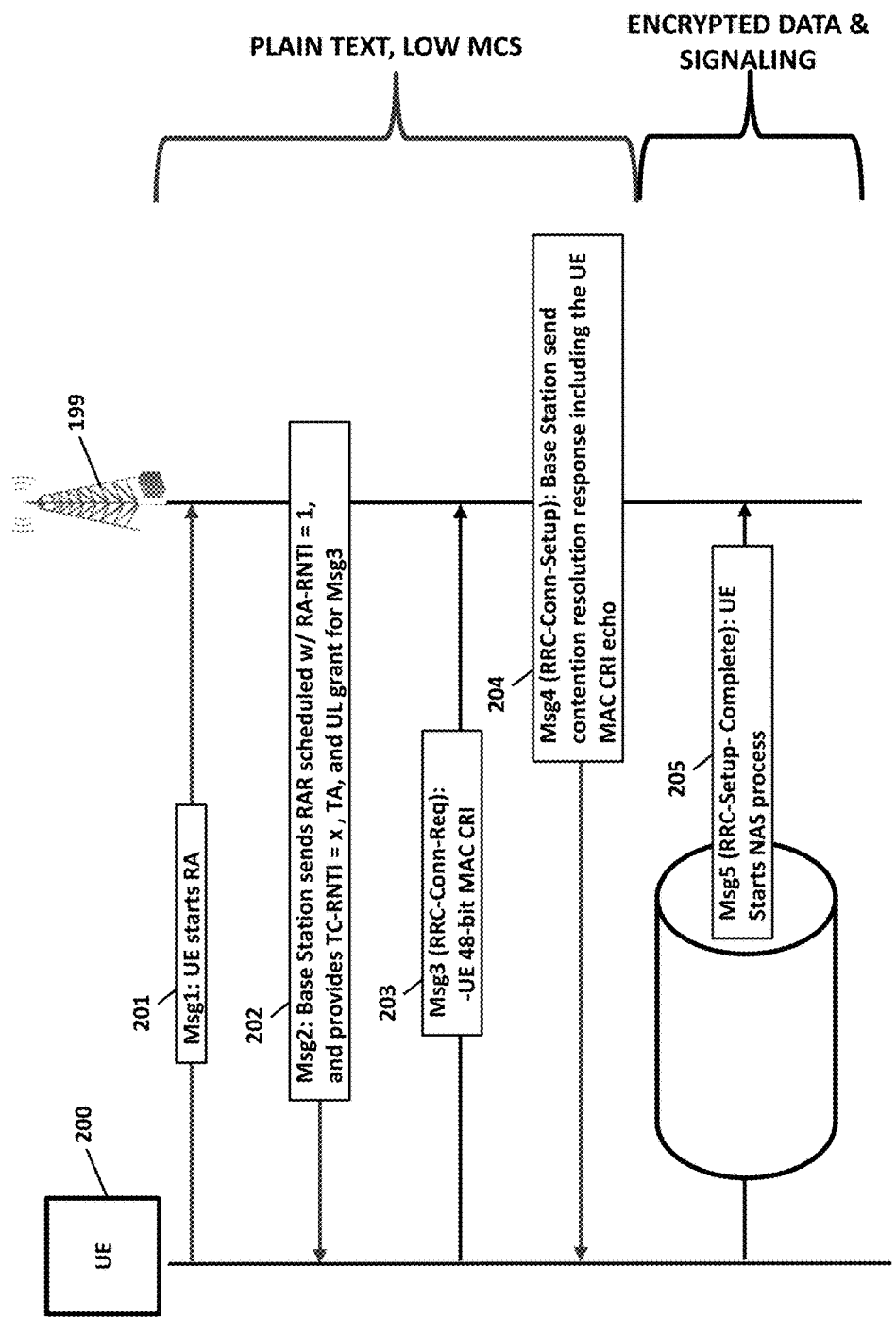
FIG. 2 is a diagram illustrating an example random access (RA) procedure associated with user equipment and a base station.

FIG. 2 is a diagram illustrating an example RA procedure associated with a UE 200 and a base station 199 (e.g., a gNB, an evolved node B (eNB), or other radio access node). In some embodiments, UE 200 may be a 4G and/or 5G (4G/5G) handset and base station 199 may represent a transceiver or other entity for communicating with the handset via a radio interface or air interface.

As depicted in FIG. 2, in step 201, a first message (Msg1), e.g., an RA preamble message, of an RA procedure may be sent from UE 200 to base station 199. Msg1 may include a particular RA radio network temporary identifier (RA-RNTI) and a particular RA preamble identifier (RAPID).

In step 202, in response to receiving Msg1, a second message (Msg2), e.g., an RA response message, of the RA procedure may be sent from base station 199 to UE 200. Msg2 may be scheduled with the RA-RNTI value of Msg1 and may provide various information, such as a temporary cell radio network temporary identifier (TC-RNTI), a timing advance (TA) UE 200 should use, a uplink scheduling grant for sending a third message (Msg3) of the RA procedure.

In step 203, after receiving Msg2, UE 200 generates or selects an arbitrary 48-bit TUEI and then generates and sends Msg3 (e.g., an RRC connection request) of the RA procedure that includes the 48-bit TUEI to base station 199.

In step 204, in response to receiving Msg3, a fourth message (Msg4), e.g., an RRC connection setup message or a contention resolution response, of the RA procedure may be broadcasted from base station 199, e.g., to UE 200 and/or other UEs in the area. Msg4 may include the 48-bit TUEI of Msg3.

In step 205, after receiving Msg4, a fifth message (Msg5), e.g., an RRC setup complete message, of the RA procedure may be sent from UE 200 to base station 199. Msg5 may initiate further signaling, e.g., a non-access-stratum (NAS) process.

It will be appreciated that FIG. 2 is for illustrative purposes and that various steps or actions described above in relation to FIG. 2 may be changed, altered, or removed. It will also be appreciated that some steps or actions may be added than those described above in relation to FIG. 2.

Figure 3:
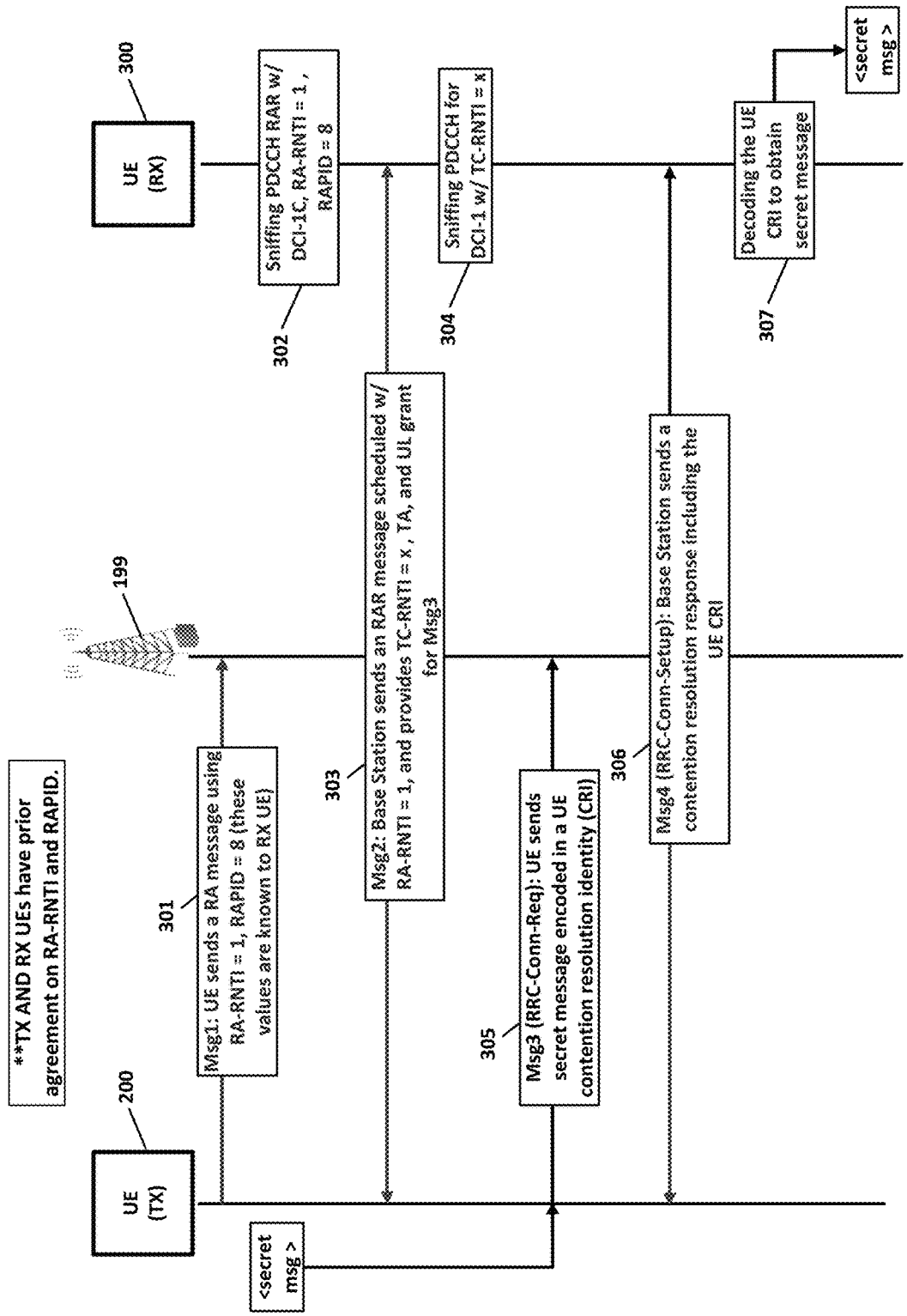
FIG. 3 is a diagram illustrating an example unauthorized message relay attack.

FIG. 3 is a diagram illustrating an example unauthorized message relay attack. As depicted in FIG. 3, UE 200 may be involved in an RA procedure similar to the one described above in relation to FIG. 2. However, in FIG. 3, UE 200 and UE 300 may exploit the behavior of base station 199 during an RA procedure or a related resource contention resolution procedure. For example, UE 200 may initiate an unauthorized message relay attack via a wireless medium access control protocol by encoding a message in a self-selected TUEI, the TUEI with the encoded message may be sent to base station 199, base station 199 may broadcast the TUEI with the encoded message to UEs in the cell area including to UE 300, and UE 300 may be capable of decoding the encoded message in the broadcasted TUEI.

Referring to FIG. 3, prior to UE 200 sending Msg1, UE 200 and UE 300 may have agreed upon various information for facilitating communications via a broadcasted TUEI. For example, UE 300 may know various values (e.g., an RA-RNTI and RAPID) that UE 200 will use when sending Msg1 to base station 199. UEs 200 and 300 may also have an agreed-upon technique or method (e.g., a code book or an encoding and decoding scheme) for unauthorized communications using a broadcasted TUEI during a resource contention resolution procedure.

In step 301, a Msg1 (e.g., an RA preamble message) of an RA procedure may be sent from UE 200 to base station 199. Msg1 may include a particular RA-RNTI and a particular RAPID.

In step 302, prior to or concurrently with step 301, UE 300 may sniff or monitor base station transmissions (e.g., a physical downlink contra channel (PDCCH)) for a future RAR message associated with UE 200, e.g., using the RA-RNTI and RAPID values that UE 300 knows is used by UE 200.

In step 303, in response to receiving Msg1, a Msg2 (e.g., an RA response message) of the RA procedure associated with UE 200 may be sent from base station 199. Msg2 may be scheduled with the RA-RNTI value of Msg1 and may provide various information, such as a TC-RNTI, a TA, an uplink scheduling grant for sending a Msg3 of the RA procedure.

In step 304, UE 300 may detect the RAR message associated with UE 200 and may use learned information (e.g., a TC-RNTI value from the RAR message) to sniff or monitor base station transmissions (e.g., a PDCCH) for a future RRC connection setup message (Msg4) associated with UE 200.

In step 305, after receiving Msg2, UE 200 may encode a message (e.g., "<secret msg>") into a TUEI (e.g., a UE CRI) and may send the TUEI with the encoded message in a Msg3 of the RA procedure (e.g., an RRC connection request message) to base station 199.

In step 306, in response to receiving Msg3, a Msg4 (e.g., an RRC connection setup message or a contention resolution response) of the RA procedure that includes the TUEI with the encoded message may be broadcasted from base station 199, e.g., to UE 200 and UE 300.

In step 307, UE 300 may receive Msg4 that includes the TUEI with the encoded message selected by UE 200. Using an agreed-upon technique (e.g., a decoding scheme or a code book), UE 300 may decode the TUEI to obtain the message from UE 200.

It will be appreciated that FIG. 3 is for illustrative purposes and that various nodes and/or modules, locations, and/or functionality described above in relation to FIG. 3 may be changed, altered, added, or removed.

Figure 4:
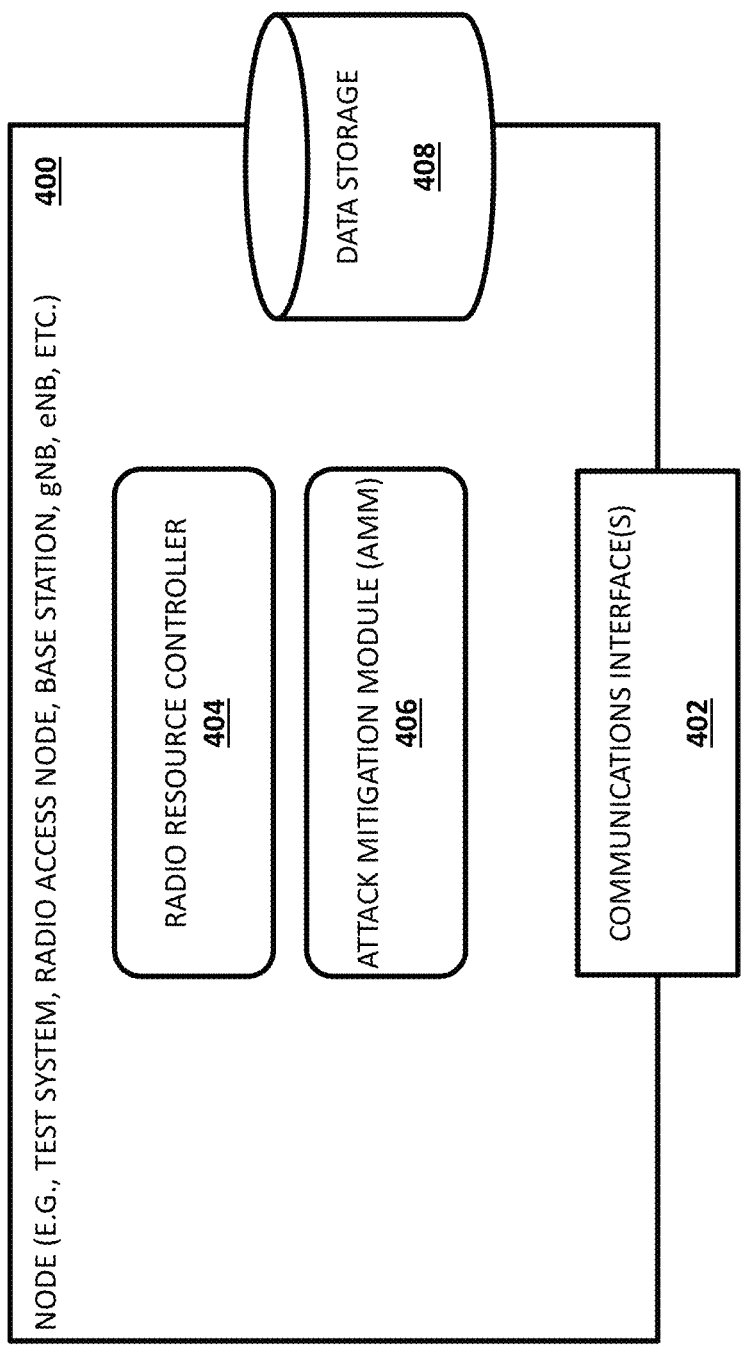
FIG. 4 is a diagram illustrating an example node for mitigating unauthorized message relay attacks.

FIG. 4 is a diagram illustrating an example node 400 for mitigating unauthorized message relay attacks. Node 400 may represent (e.g., one or more computing platforms, a network equipment test device, or a server farm) for performing various aspects related to air interface communications, radio resource contention resolution procedures, and/or mitigating unauthorized message relay attacks. In some embodiments, node 400 may include base station 199, a radio access node, or RA functionality for performing an RA procedure or related RRC functions. In such embodiments, base station 199, the radio access node, or the RA functionality may include or utilize functionality for mitigating unauthorized message relay attacks (e.g., by modifying a TUEI prior to being broadcasted during a resource contention resolution procedure).

In some embodiments, node 400 may represent a testing system, platform or device. For example, node 400 may be a stand-alone tool, a testing device, or software executing on a processor. In some embodiments, node 400 may be a single node or may be distributed across multiple computing platforms or nodes.

In some embodiments, node 400 may be configured for testing an access network (e.g., a 4G network or 5G NR network 100) or a radio access node therein. In some embodiments, node 400 may include a UE emulator or related functionality. The UE emulator may include functionality for simulating or emulating one or more 3GPP (e.g., 5G or LTE-advanced) handsets or other user devices. For example, node 400 and/or a related UE emulator may be configured for emulating or simulating contending UEs that initiate RA procedures concurrently with a radio access node being tested (e.g., the device under test (DUT) in this scenario). In this example, at least one of the contending UEs may try to exploit a resource contention resolution procedure by encoding a message into its TUEI, e.g., sent in a Msg3 of its RA procedure. Continuing with this example, node 400 and/or a related UE emulator may also be configured for emulating or simulating one or more additional UEs that attempt to receive and decode a TUEI broadcasted by the radio access node during a resource contention resolution procedure. In some embodiments, node 400 or a related entity may be configured for determining whether a tested radio access node effectively prevents data exfiltration or unauthorized message relays, e.g., by determining whether a broadcasted TUEI is sufficiently modified (e.g., from its original form) to prevent an encoded message from being successful recovered by a receiving UE.

In some embodiments, node 400 may be configured for testing 3GPP UEs (e.g., 4G/5G handsets) or related entities. In some embodiments, node 400 may include functionality for simulating or emulating one or more network nodes. For example, node 400 may emulate or simulate a radio access element (e.g., a base station, a base transceiver, a gNB, a eNB, a DU, a CU, etc.) and may be usable for testing a UE or handset to determine whether the UE or handset can effectively communicate with a radio access element that is performing one or more aspects described herein, e.g., mitigating data exfiltration or unauthorized message relays by modifying a UE-selected TUEI such that when it is broadcasted during a resource contention resolution procedure any encoded message(s) in the original UE-selected TUEI is obscured or indiscernible.

In some embodiments, testing a UE may involve the tested UE initiating an RA procedure with node 400, where, during the RA procedure, the UE sends a TUEI in an RRC connection request and node 400 broadcasts a resource contention resolution response containing a modified version of the TUEI (e.g., node 400 will use a conversion algorithm to generate the modified TUEI). In such embodiments, node 400 may determine that the tested UE can effectively receive the resource contention resolution response containing the modified TUEI and determine that the modified TUEI is indicative of its TUEI, e.g., by determining that the UE sends an RRC setup complete message.

Referring to FIG. 4, node 400 may include one or more communications interface(s) 402, a radio resource controller 404, an attack mitigation module (AMM) 406, and a data storage 408. Communications interface(s) 402 represent one or more entities (e.g., network interface cards (NICs), port modules, air interface hardware, etc.) for communicating with various entities, e.g., network nodes, UEs, or a test device.

Radio resource controller 404 may be any suitable entity or entities (e.g., software executing on a processor, a field-programmable gateway array (FPGA), and/or an application-specific integrated circuit (ASIC), or a combination of software, an FPGA, and/or an ASIC) for performing various aspects associated with allocating, managing, or controlling radio resources or related functions. In some embodiments, radio resource controller 404 may be implemented using one or more processors and/or memory and may include various functionality (or derivations thereof defined by 3GPP standards, such as 3GPP technical specification (TS) 38.321 version 16.4.0 Release 16. The disclosure of 3GPP TS 38.321 is hereby incorporated by reference in its entirety.

AMM 406 may be any suitable entity or entities (e.g., software executing on a processor, an FPGA, and/or an ASIC, or a combination of software, an FPGA, and/or an ASIC) for performing various aspects associated with mitigating an unauthorized message relay attack or a data relay exploit. For example, AMM 406 may include or utilize one or more conversion algorithms for receiving a TUEI (e.g., a 48-bit value) and generating, as output, an obscured or modified version of the TUEI. In this example, AMM 406 or a related conversion algorithm may utilize a salting technique, a cryptographic hash function (CHF), and/or a bit erasure mask technique. In some embodiments, AMM 406 may generate and provide an obscured or modified version of the TUEI along with other data (e.g., a salt value, a bit mask, etc.) to radio resource controller 404. In such embodiments, radio resource controller 404 may include the obscured or modified version of the TUEI along with the other data in a broadcasted message (e.g., an RRC connection setup message or a contention resolution message) so that receiving UEs can determine whether the obscured or modified version of the TUEI is relevant to themselves.

Node 400 or entities thereof (e.g., radio resource controller 404 and/or AMM 406) may include functionality for accessing data storage 408. Data storage 408 may be any suitable entity or entities (e.g., a storage device, a non-transitory computer readable medium, or a storage system) for maintaining or storing information related to medium access control (MAC) procedures (e.g., an RA procedure or a resource contention resolution procedure), mitigation techniques for mitigating various exploits associated with a broadcasted TUEI (e.g., a UE CRI) or a derivative thereof, and various conversion algorithms or related aspects. In some embodiments, e.g., where node 400 is a test device and/or performs emulation or simulation functions, data storage 408 may include emulation logic, testing logic, traffic generation, and/or other information usable for testing, such as test traffic generation rules and/or logic for generating performance metrics (e.g., statistics). In some embodiments, data storage 408 may be located at node 400, another node, or distributed across multiple platforms or devices.

It will be appreciated that FIG. 4 is for illustrative purposes and that various nodes and/or modules, locations, and/or functionality described above in relation to FIG. 4 may be changed, altered, added, or removed. It will also be appreciated that some modules or functionality depicted in FIG. 4 may be combined into a single module or function, e.g., radio resource controller 404 may be incorporate aspects or functionality of attack mitigation module 406.

Figure 5:
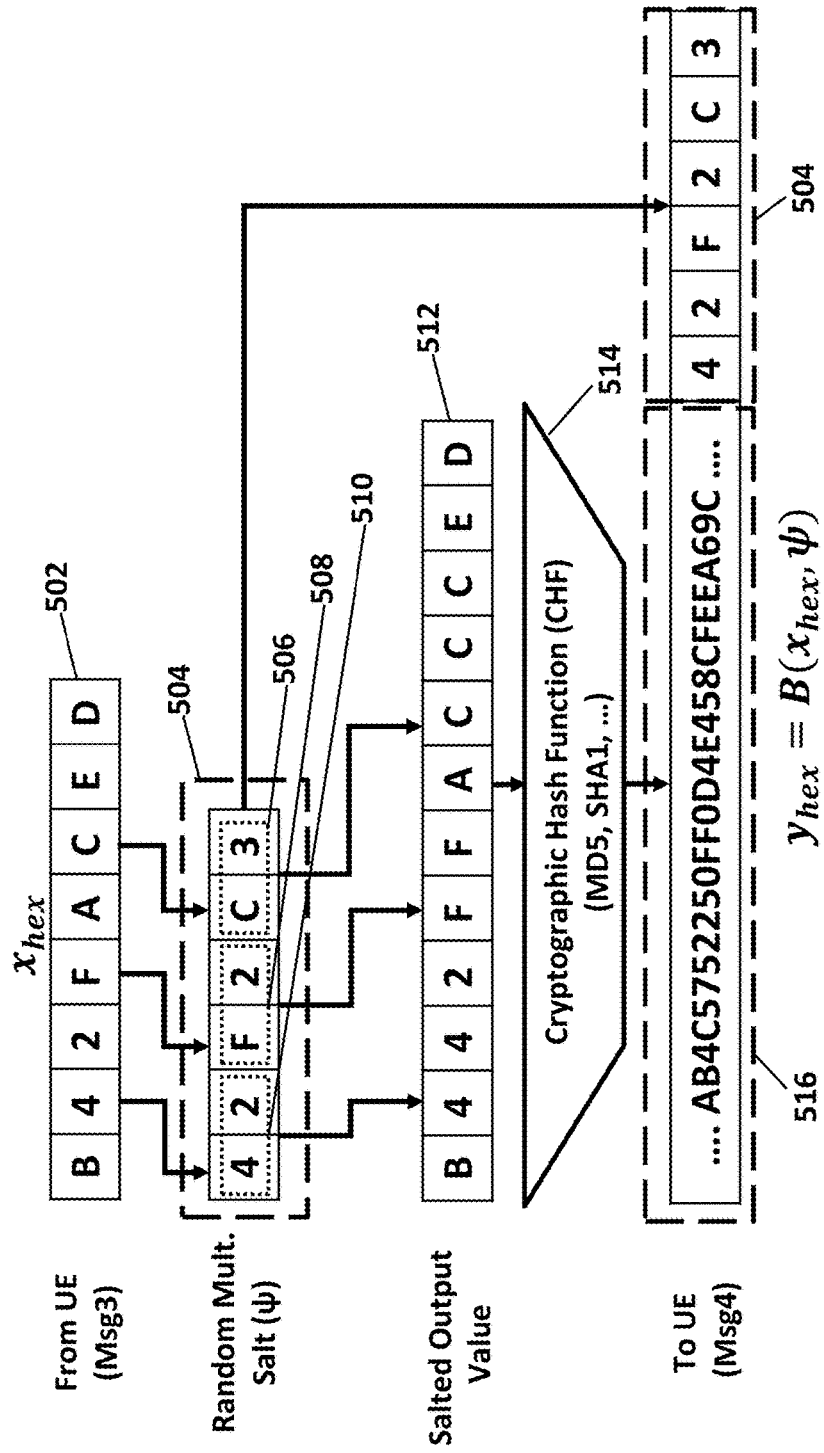
FIG. 5 is a diagram illustrating an example conversion algorithm for converting a temporary UE identifier (TUEI) utilizing a salting technique and a cryptographic hash function.

FIG. 5 is a diagram illustrating an example conversion algorithm 500 for converting a TUEI utilizing a salting technique and a CHF. Conversion algorithm 500 may convert a TUEI (e.g., a UE CRI) into an output value (e.g., a derivative or modification of TUEI) that can be used by UEs for resource contention resolution purposes, but hinders or prevents the output value from being used to provide an encoded message that was stored in the TUEI to a recipient (when the output value is broadcasted during a resource contention resolution procedure). In some embodiments, conversion algorithm 500 or a variation thereof may be usable by node 400, base station 199, or a radio access element.

In some embodiments, conversion algorithm 500 may convert a TUEI using one or more CHFs, e.g., each CHF may use a particular hash algorithm, e.g., MD5, SHA-1, SHA-2, SHA-3, RIPEMD-160, etc. For example, a CHF may use one or more deterministic, unique, and computationally irreversible functions that take an input value as input and outputs an output value (e.g., a fixed-sized value). In this example, the CHF may be a one-way function that makes it infeasible or very difficult to obtain the input value from the output value.

In some embodiments, UEs may have knowledge about conversion algorithm 500 so that contending UEs can check whether a broadcasted value in a Msg4 of an RA procedure is associated with their own CRI. For example, receiving UEs may need to know certain details about conversion algorithm 500 so that they can determine whether they won (or lost) the contended resource. In this example, a UE may modify their own TUEI based on conversion algorithm 500 and then compare that result to a broadcasted value in a received Msg4 during an RA procedure or a resource contention resolution procedure. Continuing with this example, if the UE's result and the broadcasted value match, the UE may determine that a received is meant for them.

In some embodiments, e.g., where conversion algorithm 500 involves generating output using a CHF, UEs (e.g., UE 200 and UE 300) and base station 199 (e.g., node 400) may have prior-knowledge about the CHF used. For example, a CRI x may be sent to base station 199 via a Msg3 of an RA procedure, base station 199 may use conversion algorithm 500 to convert CRI x to an output hash value h, where h is broadcasted by base station 199 in a Msg4 of the RA procedure. In this example, each UE may locally compute its own hash value h' for their own CRI x' and perform bitwise comparison with the broadcasted hash value h. If a given UE's hash value h' matches the broadcasted hash value h, then the UE can proceed to a Msg5 of the RA procedure, otherwise the UE can re-attempt the RA procedure.

By broadcasting a TUEI with no conversion or a TUEI converted using a CHF with no salting, it will be appreciated that attacker UEs (e.g., UE 200 and UE 300) may construct a codebook $\overline{\Omega}_M$ of size M, e.g., where each code in the codebook can be decoded, deciphered, or understood by a knowing entity. For example, assume $\overline{x}_l$ represents an encoded message and that every $\overline{x}_l \in \overline{\Omega}_M$ sent by UE 200 corresponds to a unique broadcasted value $\overline{y}_l$ (e.g., a TUEI or variation thereof) in a Msg4 generated using a CHF $B(\overline{x}_l)$, e.g., $\overline{y}_l = B(\overline{x}_l)$. In this example, it can be assumed that $\overline{y}_l$ can be mapped back to a unique $\overline{x}_l$ by UE 300 using a pre-computed table (e.g., a rainbow-table) of $\overline{y}_l$ for all encoded messages in $\overline{\Omega}_M$. This precomputed technique also known as preimage evasion can result in $\log_2 M$ bits per attempt.

In some embodiments, conversion algorithm 500 may utilize one or more salting techniques. For example, conversion algorithm 500 may be performed by base station 199 and may involve base station 199 generating a random value ψ for each conversion and then using the salt value and a TUEI to generate a value that is then inputted into the CHF. Some improvements can be achieved using various salting techniques (relative to a non-salted CHF technique. However, the salt value ψ used must be included in a corresponding Msg4 for contention resolution to function properly, otherwise UEs may not be able to compute B(x, ψ) on their CRI and compare it with what they receive. Therefore, salting can prevent or hinder attackers from employing codebook $\overline{\Omega}_M$. For example, salting can require an attacker UE (e.g., UE 300) to recompute each encoded message with the salt value $B(\overline{x}_l, ψ)$ for every element in $\overline{\Omega}_M$ for each received Msg4. Further, a precomputing technique becomes more difficult as well since an attacker UE (e.g., UE 300) may need to compute each encoded message with all possible salt values for every element in $\overline{\Omega}_M$.

In some embodiments, conversion algorithm 500 may utilize a random multiplicative salting technique. For example, assume a salt value or vector is randomly selected (e.g., by base station 199) from a small set of hex characters (16 possibilities) and indicates that the selected hex characters are to be repeated for a random number n of times (between 1-16) for each character instance or first instance thereof in a salted output value sent as input to a CHF, e.g., MD5, SHA-1, SHA-2 depending on the overhead. In this example, the CHF output may be sent along with the salt value so that the receiving UE can recompute the exact output (assuming its TUEI was the originating value).

Referring to FIG. 5, a TUEI 502 may be a 48-bit UE CRI represented as a hex value. A random multiplicative salt value 504 may be represented in hex form and may include pairs of elements, e.g., pairs 506, 508, and 510. Each of pairs 506, 508, and 510 may include a hex character followed by its repetition count in a salted output value 512. While the size of salted output value 512 is dependent on salt value 504, CHF 514 may generate a fixed-sized output value 516. Output value 516 and salt value 504 may be provided (e.g., as a concatenated value or otherwise) in a Msg4 of an RA procedure.

It will be appreciated that utilizing a CHF to generate an output value may result in an increased size of the broadcasted value in a Msg4 of an RA procedure. For example, a 3GPP defined UE CRI is 48 bits, while a typically CHF generated output value is 128 bits. Although this increase in size may be noticeable in low bandwidth LTE carriers (e.g., 3 and 5 megahertz (MHz) frequency bands) with limited physical downlink shared channel (PDSCH) resources, this increase should not be concerning in most 5G deployments.

In some embodiments, when using multiplicative salting the probability of CRI Error ($P_{ce}$) may be the same as the hash collision probability. It will be appreciated that computing the collision probability of a salted CHF may be extremely computationally intensive. However, it may be practically observed to be extremely low among sets of strings with variable length and weak substring correlation. Assuming elements in $\Omega_M$ are fixed size strings and already have low chance of any correlation when selected randomly, multiplicative salting can help in creating a weak correlation for ensuring a low hash collision probability.

It will be appreciated that FIG. 5 is for illustrative purposes and that various aspects described above in relation to FIG. 5 may be changed, altered, or removed.

Figure 6:
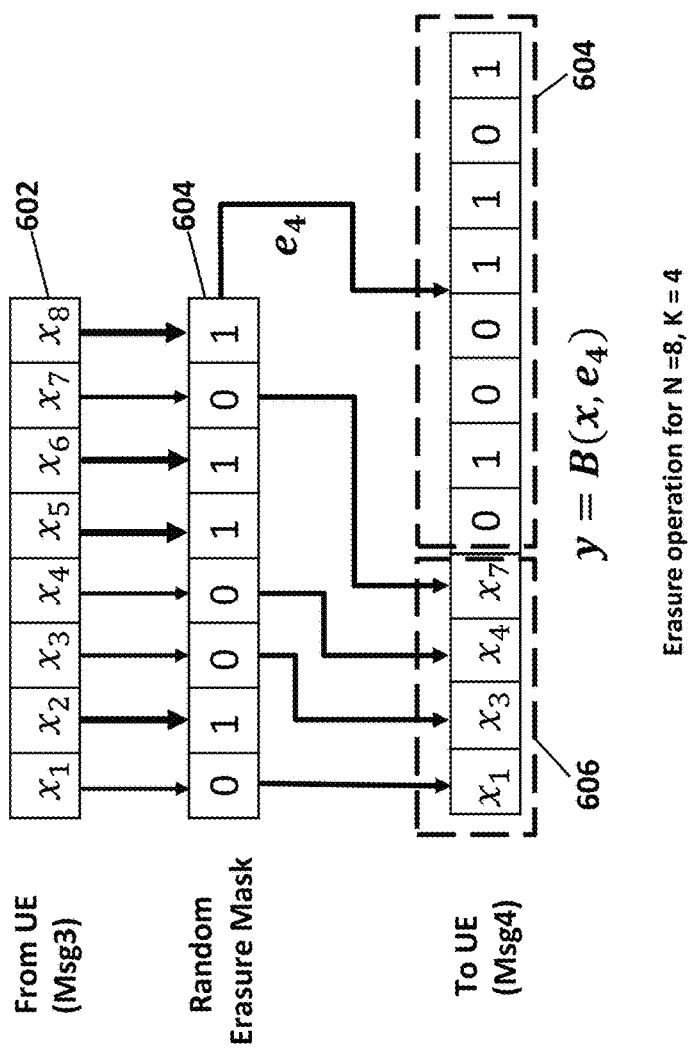
FIG. 6 is a diagram illustrating an example conversion algorithm for converting a TUEI utilizing one or more random process (RP) functions.

FIG. 6 is a diagram illustrating an example conversion algorithm 600 for converting a TUEI (e.g., a UE CRI) utilizing one or more random process (RP) functions, e.g., a bit erasure mask. Conversion algorithm 600 may convert a TUEI (e.g., a UE CRI) into an output value (e.g., a derivative or modification of TUEI) that can be used by UEs for resource contention resolution purposes, but hinders or prevents the output value from being used to provide an encoded message that was stored in the TUEI to a recipient (when the output value is broadcasted during a resource contention resolution procedure). In some embodiments, conversion algorithm 600 or a variation thereof may be usable by node 400, base station 199, or a radio access element.

In some embodiments, conversion algorithm 600 may involve performing one or more RP functions (e.g., random bit operations) on the received random variable X and may be represented as (B(X)). From an attacker's perspective, RP functions can act as a noisy channel for impairing a broadcast message (Msg4) and thus mitigating or reducing the attacker's practical data rate for communicating encoded or unauthorized messages. Known discrete channel models can inspire construction of B(X). As shown, such models may conform to a tight trade-off where impairing attacker's gain will also increase the CRI error probability.

In some embodiments, conversion algorithm 600 may be represented as B(x) and may utilize a bit or binary erasure channel (BEC). For example, conversion algorithm 600 may involve node 400 or base station 199 randomly selecting K bits from a received CRI erasing those K bits, then broadcasting only the remaining bits with a bit mask $e_K$ (e.g., the same size as X) indicating the K bits that were erased. In this example, a receiving UE can perform bitwise comparison only on remaining bits to make decision about a next step in the RA procedure.

In some embodiments, conversion algorithm 600 may be represented as B(x,$e_K$) and may utilize a random erasure bit mask vector $e_K \in \Omega_N$ with Hamming weight K. For example, conversion algorithm 600 may apply a random erasure bit mask vector to a received TUEI x to select a subsequence of x ⋈ $e_K$, of size N−K. In this example, the TUEI derivative in the broadcast message may be represented as Y=[x ⋈ $e_K$, $e_K$] and its length may be 2N−K.

Referring to FIG. 6, a TUEI 602 may be a 48-bit UE CRI represented as 8 hex characters, e.g., $x_1$-$x_8$. A random erasure mask 604 may indicate which hex characters of TUEI 602 are erased in a resulting output value 606. In some embodiments, random erasure mask 604 may be randomly determined such that the amount of hex characters and the position of hex characters erased may change from one conversion to the next. Output value 606 and random erasure mask 604 may be provided (e.g., as a concatenated value or otherwise) in a Msg4 of an RA procedure.

It will be appreciated that FIG. 6 is for illustrative purposes and that various aspects described above in relation to FIG. 6 may be changed, altered, or removed.

Figure 7:
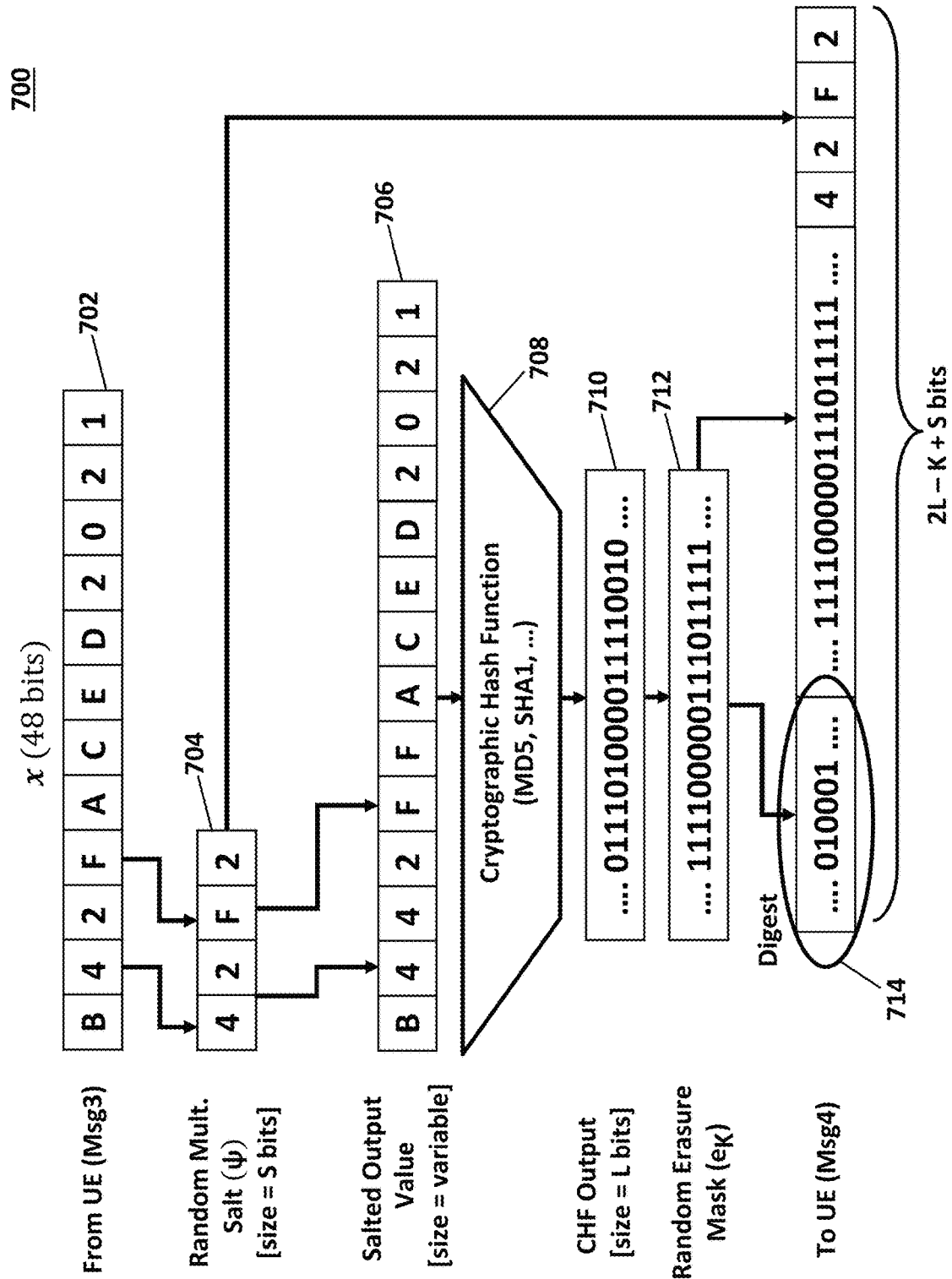
FIG. 7 is a diagram illustrating an example conversion algorithm for converting a TUEI utilizing a salting technique, a cryptographic hash function, and a bit erasure mask.

FIG. 7 is a diagram illustrating an example conversion algorithm 700 for converting a TUEI (e.g., a UE CRI) utilizing a salting technique, a CHF, and a bit erasure mask. Conversion algorithm 700 may convert a TUEI (e.g., a UE CRI) into an output value (e.g., a derivative or modification of TUEI) that can be used by UEs for resource contention resolution purposes, but hinders or prevents the output value from being used to provide an encoded message that was stored in the TUEI to a recipient (when the output value is broadcasted during a resource contention resolution procedure). In some embodiments, conversion algorithm 700 or a variation thereof may be usable by node 400, base station 199, or a radio access element.

In some embodiments, conversion algorithm 700 may involve combining aspects of algorithms 500 and 600. For example, conversion algorithm 700 may utilize a multiplicative-salted CHF with K-Erasures. In this example, conversion algorithm 700 may provide the benefits of algorithms 500 and 600 while eliminating a feasible strategy for the attacker to build an effective CRI codebook to circumvent the induced mitigations.

In some embodiments, conversion algorithm 700 may be a long-term solution and/or may be incorporated in the standards (e.g., 3GPP standards) as an optional secure CRI mechanism. However, implementing conversion algorithm 700 or related mitigation efforts across a network may not be necessary in some scenarios. For example, conversion algorithm 700 may be implemented in various scenarios or locations where mitigation is needed, e.g., a cluster of sites broadcasting near sensitive targets and facilities.

In some embodiments, conversion algorithm 700 can also be used for addressing similar issues in other applications or contexts, e.g., where a one-time use secure hash value is needed. For example, conversion algorithm 700 may be usable in a MAC address (48-bits) anonymizer, e.g., for semi-private user tracking purposes.

Referring to FIG. 7, a TUEI 702 may be a 48-bit UE CRI represented as a hex value. A random multiplicative salt value 704 may be an S-bit (e.g., 16 or 24 bits) value represented in hex form and may include pairs of elements. Each pair may include a hex character followed by its repetition count in a salted output value 706. While the size of salted output value 706 is dependent on salt value 504, CHF 708 may generate a fixed-sized CHF output 710. CHF output 710 may be an L-bit (e.g., 128, 256, or 512 bits) value represented in binary form. A random erasure mask 712 may indicate which bits of CHF output 710 are removed or erased in a resulting digest 714 and may be K-bits in size, e.g., K≤L. Digest 714 may be dependent on random erasure mask 712 and the number of bits erased but the size of digest 714 may be less than L-bits. Digest 714, random erasure mask 712, and salt value 704 may be provided (e.g., as a concatenated value or otherwise) in a Msg4 of an RA procedure. The size of digest 714, random erasure mask 712, and salt value 704 may be represented as 2L−K+S bits.

In some embodiments, conversion algorithm 700 may generate relatively longer output compared to some other algorithms (e.g., conversion algorithms 500 and/or 600). In some embodiments, algorithm 700 or a related entity may provide both the salting vector ψ and the random erasure mask $e_K$ used to generate a digest (e.g., a modified version of a TUEI) so that each UE can compute the digest value for their TUEI in a third message of an RA procedure and can perform bitwise comparison with their digest value and the broadcasted digest value they receive a fourth message of the RA procedure to make its RA decision. For example, consider MD5 used for hashing (L=128 bits) with 2-character multiplicative salting (S=16 bits) and K=64 erased bits from the hash output. This will produce a 208-bit output. Considering strong hash performance, the chance of hash collision is low.

In some embodiments, after utilizing algorithm 700 to convert a TUEI (e.g., a UE CRI), using a broadcasted converted TUEI to send unauthorized messages becomes an infeasible attack strategy. For example, it is impractical for attacker to create a codebook $\overline{\Omega}_M$. For the attacker receiver to decode the data first it needs the CHF output to be from a codebook like MDS, Fountain, etc which can survive channel erasure. Such a codebook would require attackers to reverse the entire CHF to discover a set of TUEI values in $\overline{\Omega}_M$ such that their CHF output forms a suitable codebook for channel erasure. Even without salting, mapping the reverse domain of a CHF is a non-polynomial computation. Hence, with random salting, the attackers cannot realistically pre-construct a codebook since the CHF mapping can drastically change for every attempt without any prior knowledge.

It will be appreciated that FIG. 7 is for illustrative purposes and that various aspects described above in relation to FIG. 7 may be changed, altered, or removed.

FIG. 8 is a diagram illustrating example data 800 related to various conversion algorithms. Data 800 indicates some high-level characteristics (e.g., performance impact, blocking efficacy, and attacker's codebook effect (e.g., ability for attacker to overcome) associated with different conversion algorithm. In particular, data 800 indicates that a first conversion algorithm comprising a CHF and a multiplicative salting technique (algorithm 500) has a very low performance impact, but a low blocking (mitigation) efficacy, and an attacker's can dynamically recompute its codebook to overcome the conversion algorithm. Data 800 also indicates that a second conversion algorithm comprising an RP bit erasure mask technique (algorithm 600) has a considerable performance impact, a significant blocking (mitigation) efficacy, and an attacker's codebook is static for error correction. Data 800 also indicates that a third conversion algorithm comprising a CHF, a multiplicative salting technique, and an RP bit erasure mask technique (algorithm 700) has a very low performance impact, a very high blocking (mitigation) efficacy, and an effective codebook is nearly infeasible to generate.

Figure 9:
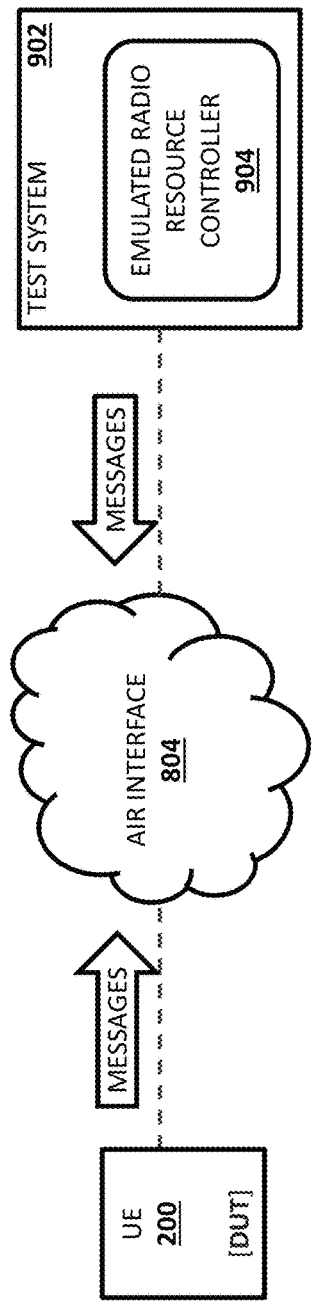
FIG. 9 is a diagram illustrating an example test system for testing a UE.

FIG. 9 is a diagram illustrating an example test system 900 for testing UE 200. In some embodiments, test system 900 may represent a testing system, platform or device. For example, test system 900 may be a stand-alone tool, a testing device, or software executing on one or more processors. In some embodiments, test system 900 may be a single node or may be distributed across multiple computing platforms or nodes.

In some embodiments, test system 900 may be configured for testing 3GPP UEs or related entities. In some embodiments, test system 900 may include an emulated radio resource controller 904 for emulating or simulating a radio access element (e.g., a base station, a gNB, a eNB, a DU, a CU, etc.) or related functionality. For example, emulated radio resource controller 904 may be any suitable entity or entities (e.g., software executing on a processor, a field-programmable gateway array (FPGA), and/or an application-specific integrated circuit (ASIC), or a combination of software, an FPGA, and/or an ASIC) for performing various aspects associated with allocating, managing, or controlling radio resources or related functions.

In some embodiments, emulated radio resource controller 904 may be usable in testing UE 200 to determine whether UE 200 can effectively communicate with a radio access element that is performing one or more aspects described herein, e.g., mitigating data exfiltration or unauthorized message relays by modifying a UE-selected TUEI such that when the modified version is broadcasted during a resource contention resolution procedure any encoded message(s) in the original UE-selected TUEI is obscured or indiscernible.

In some embodiments, testing UE 200 may involve the tested UE 200 initiating an RA procedure with test system 900, where, during the RA procedure, UE 200 sends a TUEI in an RRC connection request and test system 900 broadcasts a resource contention resolution response containing a modified version of the TUEI (e.g., test system 900 will use a conversion algorithm to generate the modified TUEI). In such embodiments, test system 900 may determine that UE 200 can effectively receive the resource contention resolution response containing the modified TUEI and determine that the modified TUEI is indicative of its TUEI, e.g., by determining that UE 200 sends an RRC setup complete message.

It will be appreciated that FIG. 9 is for illustrative purposes and that various steps or actions described above in relation to FIG. 9 may be changed, altered, or removed. It will also be appreciated that some steps or actions may be added than those described above in relation to FIG. 9.

Figure 10:
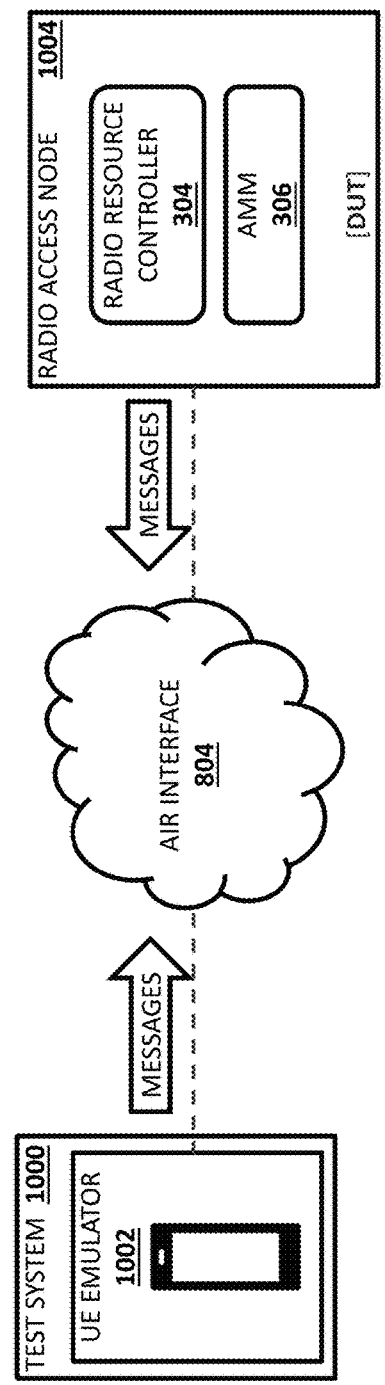
FIG. 10 is a diagram illustrating an example test system for testing a radio access node or a related network.

FIG. 10 is a diagram illustrating an example test system 1000 for testing a radio access node 1004 (e.g., eNB or gNB) or a related network. In some embodiments, test system 1000 may represent a testing system, platform or device. For example, test system 1000 may be a stand-alone tool, a testing device, or software executing on a processor. In some embodiments, test system 1000 may be a single node or may be distributed across multiple computing platforms or nodes.

In some embodiments, test system 1000 may be configured for testing an access network (e.g., a 4G network or 5G NR network 100) or radio access node 1004. In some embodiments, test system 1000 may include a UE emulator 1002 or related functionality. For example, UE emulator 1002 may be any suitable entity or entities (e.g., software executing on a processor, an FPGA, and/or an ASIC, or a combination of software, an FPGA, and/or an ASIC) for emulating or simulating one or more UEs.

In some embodiments, UE emulator 1002 may include functionality for simulating or emulating one or more 3GPP (e.g., 5G or LTE-advanced) handsets or other user devices. For example, UE emulator 1002 may be configured for emulating or simulating contending UEs that initiate RA procedures concurrently with radio access node 1004 (e.g., the DUT in this scenario). In this example, at least one of the contending UEs may try to exploit a resource contention resolution procedure by encoding a message into its TUEI, e.g., sent in a Msg3 of its RA procedure. Continuing with this example, UE emulator 1002 may also be configured for emulating or simulating one or more additional UEs that attempt to receive and decode a TUEI broadcasted by radio access node 1004 during a resource contention resolution procedure. In some embodiments, test system 1000 or a related entity may be configured for determining whether radio access node 1004 effectively prevents data exfiltration or unauthorized message relays, e.g., by determining whether a broadcasted TUEI is sufficiently modified (e.g., from its original form) to prevent an encoded message from being successful recovered by a receiving UE.

It will be appreciated that FIG. 10 is for illustrative purposes and that various steps or actions described above in relation to FIG. 10 may be changed, altered, or removed. It will also be appreciated that some steps or actions may be added than those described above in relation to FIG. 10.

Figure 11:
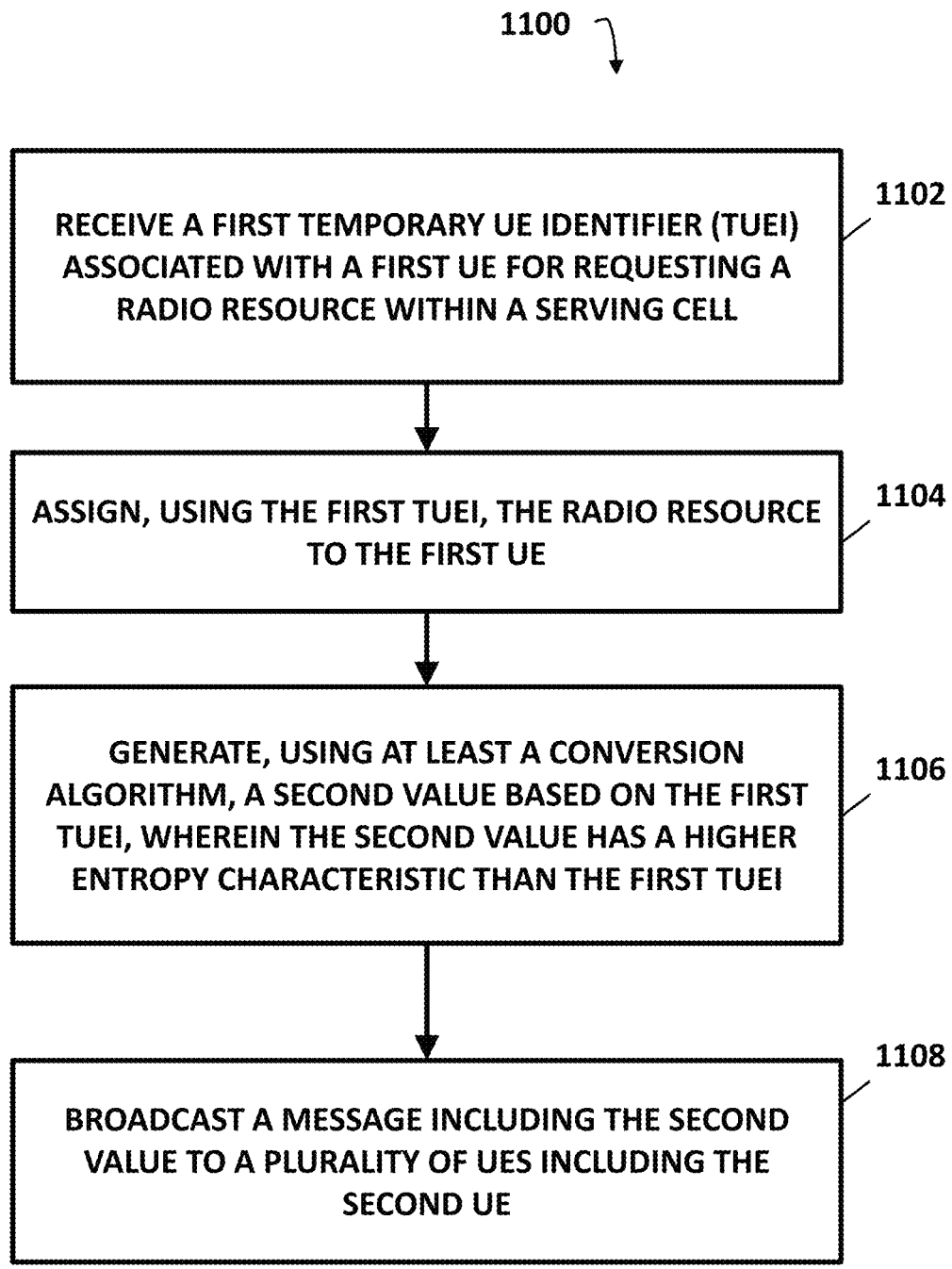
FIG. 11 is a diagram illustrating an example process for mitigating unauthorized message relay attacks.

FIG. 11 is a diagram illustrating an example process 1100 for network testing using CTI. In some embodiments, process 1100, or portions thereof, may be performed by or at node 400, test system 900, test system 1000, and/or another node or module. For example, process 1100 or steps or actions thereof may be performed by or at a network node (e.g., radio access node or a base station) configured to relay network message information or derivative information to avoid resource contentions between UE. In some embodiments, process 1100 may include steps 1102, 1104, 1106, and/or 1108.

Referring to process 1100, in step 1102, a first TUEI associated with a first UE may be received for requesting a radio resource within a serving cell, e.g., associated with base station 199 or node 400.

In step 1104, the radio resource may be assigned to the first UE using the first TUEI.

In step 1106, a second value may be generated, using at least a conversion algorithm, based on the first TUEI, wherein the second value has a higher entropy characteristic than the first TUEI. For example, a first TUEI may be converted using algorithm 700 to a second value, where the second value is less likely to have a decodable or discernible message than the first TUE. In some embodiments, algorithm 700 may generate a second value that obscures or remove any messages encoded in a first TUEI (e.g., an inputted UE CRI) by a receiving UE. In some embodiments, a generated second value based on a first TUEI may reduce (relative to the TUEI) the likelihood of the second value including an encoded message decodable by a second UE when relayed by the network node.

In step 1108, a message including the second value may be broadcasted to a plurality of UEs including the second UE.

In some embodiments, a conversion algorithm may erase some of the bits in a first TUEI. In such embodiments, an erasure mask indicating the location of the bits erased may be included (along with the outputted value based on the first TUEI) in the broadcasted message (e.g., Msg4 of an RA procedure).

In some embodiments, a conversion algorithm may use multiplicative salting when generating the second value.

In some embodiments, a conversion algorithm may use a first TUEI, at least one salt value, and at least one CHF when generating a second value.

In some embodiments, a conversion algorithm may be a one-way function in that an outputted second value cannot be converted back to an inputted first TUEI by a second UE.

In some embodiments, a first TUEI cannot be derived from a second value by a second UE.

In some embodiments, a first TUEI may be a MAC identifier or a UE CRI.

In some embodiments, a second value can be used by a second UE to avoid requesting or using a same radio resource assigned to the first UE.

In some embodiments, a second value can be used by a first UE to determine that a radio resource has been assigned to itself.

In some embodiments, a network node performing process 1100 or steps thereof may be a radio access node emulation associated with a test system for testing UE devices.

In some embodiments, a first UE or a second UE may be a UE emulation associated with a test system for testing radio access nodes.

In some embodiments, a network node performing process 1100 or steps may include a radio access node, a base station, a base transceiver, a nodeB, an eNodeB, a gNodeB, an 802.X access point, a 5G non-terrestrial network radio interface node.

In some embodiments, the network node may be configured to generate and broadcast a plurality of messages during periods of radio resource request quiescence for creating random access confusion. In such embodiments, the plurality of messages include TUEIs or derivations thereof received by the network node from one or more UEs.

In some embodiments, a network node performing process 1100 or steps may be configured to analyze a second TUEI associated with a third UE for a relay related violation and, in response to detecting a relay related violation preventing broadcasting of a message associated with the third UE. In such embodiments, the network node compares known or estimated physical layer information and reported physical layer information in the second TUEI and detects the relay related violation by determining a difference between the known or estimated physical layer information and the reported physical layer information.

It will be appreciated that process 1100 is for illustrative purposes and that different and/or additional actions may be used. It will also be appreciated that various actions described herein may occur in a different order or sequence.

It should be noted that node 400, test system 900, test system 1000, and/or functionality described herein may constitute a special purpose computing device. Further, node 400, test system 900, test system 1000, and/or functionality described herein can improve the technological field of network security and/or related UE and network node testing.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for mitigating unauthorized message relay attacks, the method comprising:
   at a network node configured to relay network message information or derivative information to avoid resource contentions between user equipment (UE):
      receiving a first temporary UE identifier (TUEI) associated with a first UE for requesting a radio resource within a serving cell;
      assigning, using the first TUEI, the radio resource to the first UE;
      generating, using at least a conversion algorithm, a second value based on the first TUEI, wherein the second value has a higher entropy characteristic than the first TUEI, thereby reducing the likelihood of the second value including an encoded message decodable by a second UE when relayed by the network node; and
      broadcasting a message including the second value to a plurality of UEs including the second UE.

2. The method of claim 1 wherein the conversion algorithm uses multiplicative salting when generating the second value;
   wherein the conversion algorithm uses the first TUEI, at least one salt value, and at least one cryptographic hash function (CHF) when generating the second value; or
   wherein the conversion algorithm uses a bits erasure mask indicating bits of the TUEI or a CHF outputted value to erase when generating the second value.

3. The method of claim 1 wherein the conversion algorithm is a one-way function in that the second value cannot be converted back to the first TUEI by the second UE; or
wherein the first TUEI cannot be derived from the second value by the second UE.

4. The method of claim 1 wherein the second value can be used by the second UE to avoid requesting the same radio resource assigned to the first UE; or
wherein the second value can be used by the first UE to determine that the radio resource has been assigned to itself.

5. The method of claim 1 wherein the network node is a radio access node emulation associated with a test system for testing UE devices; or
wherein the first UE or the second UE is a UE emulation associated with a test system for testing radio access nodes.

6. The method of claim 1 wherein the network node includes a radio access node, a base station, a base transceiver, a nodeB, an eNodeB, a gNodeB, an 802.X access point, a fifth generation (5G) non-terrestrial network radio interface node; or
wherein the first TUEI is a medium access control (MAC) identifier or a UE contention resolution identity (CRI).

7. The method of claim 1 wherein the network node is configured to generate and broadcast a plurality of messages during periods of radio resource request quiescence for creating random access confusion.

8. The method of claim 7 wherein the plurality of messages include TUEIs or derivations thereof associated with one or more UEs.

9. The method of claim 1 wherein the network node is configured to analyze a second TUEI associated with a third UE for a relay related violation and, in response to detecting a relay related violation preventing broadcasting of a message associated with the third UE.

10. The method of claim 9 wherein the network node compares known or estimated physical layer information and reported physical layer information in the second TUEI and detects the relay related violation by determining a difference between the known or estimated physical layer information and the reported physical layer information.

11. A system for mitigating unauthorized message relay attacks, the system comprising:
at least one processor;
a network node configured to relay network message information or derivative information to avoid resource contentions between user equipment (UE), wherein the network node is implemented using the at least one processor, wherein the network node is configured for:
receiving a first temporary UE identifier (TUEI) associated with a first UE for requesting a radio resource within a serving cell;
assigning, using the first TUEI, the radio resource to the first UE;
generating, using at least a conversion algorithm, a second value based on the first TUEI, wherein the second value has a higher entropy characteristic than the first TUEI, thereby reducing the likelihood of the second value including an encoded message decodable by a second UE when relayed by the network node; and
broadcasting a message including the second value to a plurality of UEs including the second UE.

12. The system of claim 11 wherein the conversion algorithm uses multiplicative salting when generating the second value;
wherein the conversion algorithm uses the first TUEI, at least one salt value, and at least one cryptographic hash function (CHF) when generating the second value; or
wherein the conversion algorithm uses a bits erasure mask indicating bits of the TUEI or a CHF outputted value to erase when generating the second value.

13. The system of claim 11 wherein the conversion algorithm is a one-way function in that the second value cannot be converted back to the first TUEI by the second UE;
wherein the first TUEI cannot be derived from the second value by the second UE;
wherein the second value can be used by the second UE to avoid requesting the same radio resource assigned to the first UE; or
wherein the second value can be used by the first UE to determine that the radio resource has been assigned to itself.

14. The system of claim 11 wherein the network node is a radio access node emulation associated with a test system for testing UE devices; or
wherein the first UE or the second UE is a UE emulation associated with a test system for testing radio access nodes.

15. The system of claim 11 wherein the network node includes a radio access node, a base station, a base transceiver, a nodeB, an eNodeB, a gNodeB, an 802.X access point, a fifth generation (5G) non-terrestrial network radio interface node; or
wherein the first TUEI is a medium access control (MAC) identifier or a UE contention resolution identity (CRI).

16. The system of claim 11 wherein the network node is configured to generate and broadcast a plurality of messages during periods of radio resource request quiescence for creating random access confusion.

17. The system of claim 16 wherein the plurality of messages include TUEIs or derivations thereof associated with one or more UEs.

18. The system of claim 11 wherein the network node is configured to analyze a second TUEI associated with a third UE for a relay related violation and, in response to detecting a relay related violation preventing broadcasting of a message associated with the third UE.

19. The system of claim 18 wherein the network node compares known or estimated physical layer information and reported physical layer information in the second TUEI and detects the relay related violation by determining a difference between the known or estimated physical layer information and the reported physical layer information.

20. A non-transitory computer readable medium having stored thereon executable instructions embodied in the non-transitory computer readable medium that when executed by at least one processor of a computer cause the computer to perform steps comprising:
at a network node configured to relay network message information or derivative information to avoid resource contentions between user equipment (UE):
receiving a first temporary UE identifier (TUEI) associated with a first UE for requesting a radio resource within a serving cell;
assigning, using the first TUEI, the radio resource to the first UE;
generating, using at least a conversion algorithm, a second value based on the first TUEI, wherein the second value has a higher entropy characteristic than the first TUEI, thereby reducing the likelihood of the second value including an encoded message decodable by a second UE when relayed by the network node; and broadcasting a message including the second value to a plurality of UEs including the second UE.

\* \* \* \* \*